April 22, 1930.  C. G. HERSHEY  1,756,005
MEASURING INSTRUMENT
Filed March 4, 1924  2 Sheets-Sheet 1
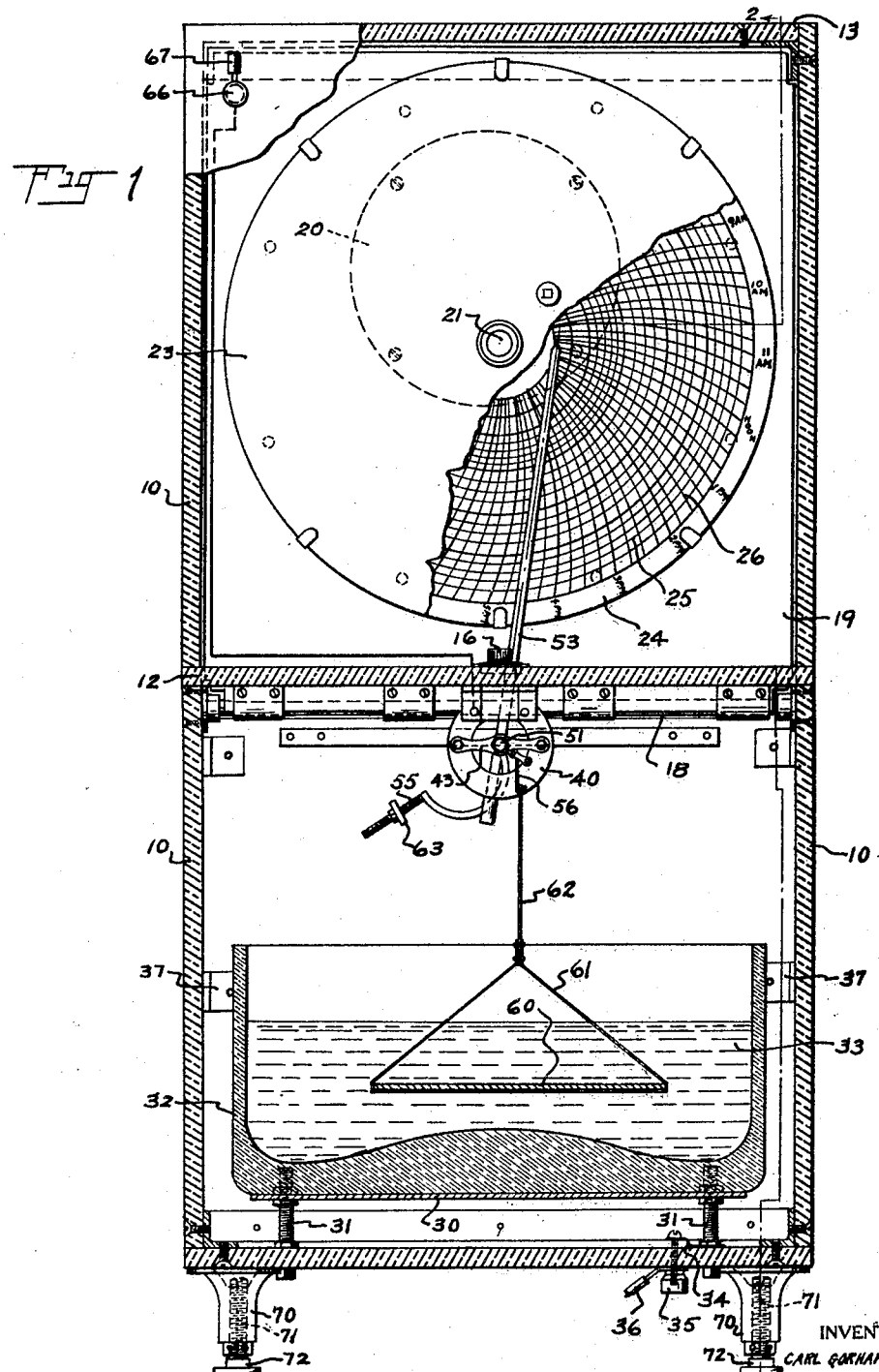

April 22, 1930. C. G. HERSHEY 1,756,005
MEASURING INSTRUMENT
Filed March 4, 1924   2 Sheets-Sheet 2
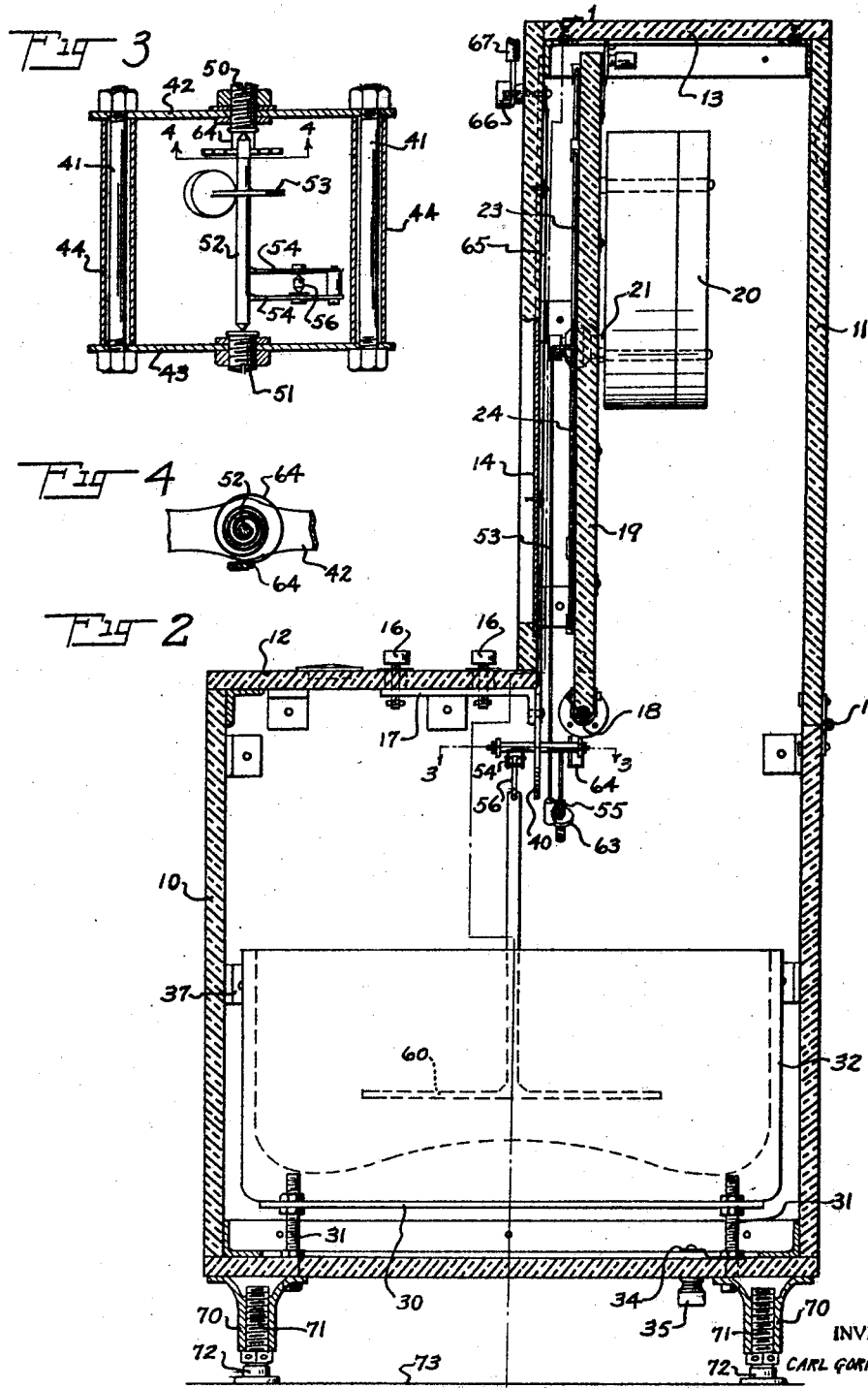
INVENTOR
CARL GORHAM HERSHEY
BY Albert M. Austin
ATTORNEY Patented Apr. 22, 1930

1,756,005

UNITED STATES PATENT OFFICE

CARL GORHAM HERSHEY, OF EL PASO, TEXAS, ASSIGNOR TO AMERICAN SMELTING AND REFINING COMPANY, OF NEW YORK, N. Y., A CORPORATION OF NEW JERSEY

MEASURING INSTRUMENT

Application filed March 4, 1924. Serial No. 696,823.

This invention relates to measuring instruments for measuring, indicating and recording electrical potentials.

It is an object of the present invention to provide an improved instrument for measuring, indicating and recording voltages of relatively high values.

One feature of the invention relates to improved means for making electrical connection to the indicating element of the device, whereby a reliable and dependable connection, not liable to get out of order, is provided.

Another feature relates to the provision of dampening and separating means for the indicating mechanism whereby the spacing of relatively moving parts and dampening of the moving parts may be controlled, and whereby electrical contact between oppositely charged parts is effectively prevented. Thus undesired and dangerous short circuits are prevented.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 shows a sectional elevation of an instrument embodying features of the invention;

Figure 2 is a section taken on the line 2—2 of Figure 1;

Figure 3 is a section taken on the line 3—3 of Figure 2; and

Figure 4 is a section taken on the line 4—4 of Figure 3.

Referring to the drawings, there is a casing 10 of micarta or the like, having a separable back cover 11, a front shelf 12, and a top 13. A portion of the front of the casing 10 above the shelf 12 is transparent, being formed of a glass window 14. This permits of convenient observation and inspection of the actuating mechanism within the casing. The back cover plate is hinged along one edge, as at 15, by means of a suitable hinge. Adjustably secured to the lower face of the shelf 12 by means of a pair of adjusting screws 16, 16 is a bracket 17. Pivotally mounted on a hinge 18 is an insulating instrument board 19, formed of micarta or the like.

For recording the measurements to be made, there is provided a record device, including a clock 20 mounted upon the rear upper face of the board 19. The clock 20 has a main shaft 21 driven by the clock mechanism at a constant rate of speed. Mounted upon the shaft 21 to rotate therewith is a metal chart holder 23. The chart holder is preferably substantially flat and smooth, forming a mounting for a recording chart 24. The chart 24 is replaceable and its surface is suitably prepared.

The chart may have printed thereon circular concentric division lines, such as 25, 25, the spacing of which is calibrated to desired units of measurements, such as one hundred volts. The chart may also be divided by division lines, such as 26, 26, transverse to the concentric lines, the spacing being calibrated to units of time, such as quarter hour periods. It will be seen that the clock is made accessible by rotating the back cover 11 about its hinge 15 in a clockwise direction as seen in Figure 2, and that the chart holder is made readily accessible by similarly rotating the instrument board 19 in a similar direction about its hinge 18.

The indicating mechanism includes a stationary electrode plate 30 adjustably mounted upon a plurality of threaded studs such as 31 each clamped at its lower end to the bottom of the casing 10. Mounted upon the electrode plate 30 is a vat or container 32, preferably formed of glass, and there is provided within the container 32, a suitable quantity of oil or other substance 33, for dampening the movement of the moving parts, as will hereinafter appear. The plate 30 is formed of metal, and is a conductor of electricity, and is connected by means of a conducting strip 34 fastened by one stud 31 (see Figure 1) to a binding post 35 and by way of a conductor 36 to one pole of a source of electric potential, (not shown) the voltage of which is to be measured. The container 32 is held securely in place by suitable angles, such as 37, 37, fastened to the interior of the casing 10.

Secured to the bracket 17, as by being bolted thereto, is a ring 40, forming a mechanism support. There is mounted upon this ring, in substantially horizontal alignment and diametrically opposed, a pair of elongated bolts 41, 41, and upon the opposite ends of these bolts is mounted a pair of spaced bars 42, 43, (see Figure 3). Suitable sleeves 44, 44 are provided upon the bolts 41 as shown, so that the bars 42 and 43 are held in substantially parallel and spaced relation to the plane of the ring 40.

For reducing the friction of the moving parts of the mechanism to a minimum, there is provided a pair of jewel bearings 50 and 51 affixed upon intermediate portions of the bars 42 and 43, respectively and opposite to one another. These form supports for a rotatable trunnion 52 upon which there is mounted for rotation therewith a radial pointer arm 53, an operating arm 54 and a counterweight arm 55. The operating arm comprises a saddle in which is pivotally mounted a link 56 extending downwardly therefrom.

For actuating the indicating mechanism there is provided a movable electrode comprising a substantially flat member 60 suspended in a cradle 61. The cradle 61 is fastened to the lower end of a lead 62, the upper end of which is fastened to the free end of the link 56. The pointer arm 53 is counterbalanced by a weight 63, adjustably positioned upon the counterweight arm 55.

A hair spring 64 (see Figure 4) interconnects electrically the trunnion 52 and a bracket fastened to the bar 42, without materially interfering with the rotary movement of the trunnion 52.

The electrode 60, cradle 61, lead 62, link 56, trunnion 52, hairspring 64, bars 42 and 43, and ring 40 are formed of electrical conducting material. A conductor 65 connects the ring 40 with a binding post 66 positioned in the upper portion of the micarta casing 10. A conductor 67 extends from the binding post 66 to the pole of the source of electric potential the voltage of which is to be measured opposite to the pole connected to the conductor 36 hereinbefore mentioned.

The casing 10 is provided with a plurality of hollow legs such as 70, each of which is internally screw threaded for the reception of an inverted bolt, the head 72 of which rests upon the floor 73. To take care of any irregularities of the floor the several bolts 71 are adjustably positioned so that the fixed electrode 30 is substantially level, and thus in substantial parallelism with the suspended electrode 60.

When used as an electrostatic voltmeter the device may be calibrated by applying a known voltage across the binding posts 35, 66. The suspended electrode 60 is attracted towards the fixed electrode 30, in accordance with well known laws of electricity, and the counter weight 63 is adjusted so that the pointer 53 takes up a desired position opposite the chart 24. This position then indicates one of the concentric lines corresponding to the voltage then being applied. Several different known voltages are then applied, and the successive positions of the pointer arm 53 are similarly observed.

The free end of the pointer arm 53 is spaced apart from the face of the chart, and thus friction is reduced to a minimum. A record is made of the successive indications by passing a spark between the pointer arm and the chart, the latter having been prepared for that purpose. This chart is acted upon by the action of the spark and when so acted upon forms a record.

Thus it will be seen that I have provided an improved indicating and recording instrument for high electric voltage, in which a legible record is made without unnecessary contact and friction between the indicating mechanism and the record device. The records are made upon calibrated charts which may be readily replaced without disturbing the indicating mechanism. Access may be had to the clock mechanism for adjustment thereof without disturbing the calibration of the indicating mechanism.

Positive reliable electric contact is made to the moving parts of the indicating mechanism, by means of simple and rugged conducting means. Levelling and other adjustments of the mechanism may be effected in a positive manner.

The parts of my improved measuring device are simple, cheap and easy to assemble, and the structure is particularly well adapted for the purpose for which it is intended.

While I have shown and described and have pointed out in the annexed claims certain novel features of my invention, it will be understood that various omissions, substitutions and changes in the form and details of the device illustrated and in its operation may be made by those skilled in the art without departing from the spirit of my invention.

Having thus described my invention I claim:

1. In an electrostatic recording voltmeter, a chart, an electrostatic voltmeter having an indicator in operative relation to said chart, and means whereby the potential measured causes a spark between said indicator and chart to make a legible record.

2. An electrostatic recording voltmeter comprising a chart, an indicator spaced from said chart and in operative relation therewith, an electrostatic voltmeter having elements operable in accordance with an applied potential, means for moving said indicator in accordance with the movement of said elements, and means for applying the potential to be measured directly to the electrostatic elements and to said indicator whereby the potential being measured produces a spark between said indicator and said chart and sets up electrostatic forces for moving said voltmeter.

3. An electrostatic recording voltmeter comprising a casing, an electrode in the lower portion of said casing and electrically connected to one pole of the source of voltage to be measured, a vat positioned above and in contact with said electrode and adapted to contain oil, a framework supported from said casing above said vat, a trunnion supported by said framework in rotatable relation thereto, a lever arm rigidly attached to said trunnion, a link dependent from said lever arm and supporting a second electrode within said vat but spaced from the walls and bottom thereof, a pointer attached to said trunnion and rotatable therewith, a chart near to but spaced from the end of said pointer, said framework, trunnion, lever, link, second electrode and pointer being electrically connected to the second pole of the source of voltage to be measured, whereby the said voltage causes said pointer to be moved across the face of said chart and simultaneously causes a continuous stream of sparks to pass from the end of said pointer to said chart.

Signed at El Paso, in the county of El Paso and State of Texas, this 21st day of February, A. D. 1924.

CARL GORHAM HERSHEY.